United States Patent
Hoffmann et al.

(10) Patent No.: US 12,415,936 B2
(45) Date of Patent: Sep. 16, 2025

(54) COATING MATERIAL SYSTEM BASED ON A BISMUTH-CONTAINING CATALYST COMPRISING AT LEAST ONE AROMATIC SUBSTITUENT

(71) Applicant: BASF COATINGS GMBH, Münster (DE)

(72) Inventors: Peter Hoffmann, Muenster (DE); Benedikt Schnier, Muenster (DE); Christian Beckhaus, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 0 days.

(21) Appl. No.: 17/754,775

(22) PCT Filed: Oct. 7, 2020

(86) PCT No.: PCT/EP2020/078188
§ 371 (c)(1),
(2) Date: Apr. 12, 2022

(87) PCT Pub. No.: WO2021/073987
PCT Pub. Date: Apr. 22, 2021

(65) Prior Publication Data
US 2024/0301235 A1 Sep. 12, 2024

(30) Foreign Application Priority Data
Oct. 14, 2019 (EP) .................................. 19202928

(51) Int. Cl.
*C09D 175/04* (2006.01)
*C08G 18/22* (2006.01)
*C08G 18/79* (2006.01)

(52) U.S. Cl.
CPC ......... *C09D 175/04* (2013.01); *C08G 18/227* (2013.01); *C08G 18/792* (2013.01); *C08G 2150/00* (2013.01)

(58) Field of Classification Search
CPC . C09D 175/04; C08G 18/227; C08G 2150/00
See application file for complete search history.

(56) References Cited

U.S. PATENT DOCUMENTS

| | | | | |
|---|---|---|---|---|
| 4,584,362 A | * | 4/1986 | Leckart | ................ C08G 18/227 521/123 |
| 4,788,083 A | | 11/1988 | Dammann et al. | |
| 2018/0016381 A1 | * | 1/2018 | Hoffmann | .......... C08G 18/3203 |
| 2022/0118431 A1 | * | 4/2022 | Hoffmann | .............. C08G 18/73 |

FOREIGN PATENT DOCUMENTS

| | | | | |
|---|---|---|---|---|
| CA | 3038858 A1 | 4/2018 | | |
| CN | 87102399 A | 10/1987 | | |
| JP | H04227620 A | 8/1992 | | |
| WO | 2016120160 A1 | 8/2016 | | |
| WO | 2018069018 A1 | 4/2018 | | |
| WO | WO-2020160939 A1 * | 8/2020 | ............. | B01J 31/04 |
| WO | 2020186397 A1 | 9/2020 | | |

OTHER PUBLICATIONS

Machine Translation of Foreign priority of EP 19155916 of Application No. 17/4277,761 (Year: 2019).*
International Search Report and Written Opinion for corresponding PCT/EP2020/078188 mailed Jan. 15, 2021; 10 pages.
"aryl groups: Gold Book" In: "IUPAC Compendium of Chemical Terminology", Jun. 12, 2009 (Jun. 12, 2009), IUPAC, Research Triangle Park, NC, XP055460338, ISBN: 978-0-9678550-9-7, DOI: 10.1351/goldbook.A00464.

* cited by examiner

*Primary Examiner* — Mark S Kaucher
(74) *Attorney, Agent, or Firm* — Armstrong Teasdale LLP

(57) ABSTRACT

Disclosed herein is a coating material system including components (A) to (C) and optional further components. The optional components may be separated from one another, or they may also be wholly or at least partly mixed The coating material system may additionally include at least one optional component such as a solvent.
Component (A) includes at least one polyhydroxy group-containing compound and component (B) includes at least one polyisocyanate-containing compound. Component (C) is at least one bismuth-containing catalyst. Further components which may be present in the coating material system include, for example, hydroxyl-containing compounds, coating additives, pigments and/or solvents.

19 Claims, No Drawings

COATING MATERIAL SYSTEM BASED ON A BISMUTH-CONTAINING CATALYST COMPRISING AT LEAST ONE AROMATIC SUBSTITUENT

CROSS-REFERENCE TO RELATED APPLICATIONS

This application is a U.S. National Phase Application of International Patent Application No. PCT/EP2020/078188, filed Oct. 7, 2020, which claims priority to European Patent Application No. 19202928.8, filed Oct. 14, 2019, each of which is hereby incorporated by reference herein.

The invention relates to a coating material system which comprises components (A) to (C) and also, optionally, further components, with, in a first option, all components (A) to (C) and also, where present, the further optional components being present separately from one another, in other words, the individual components are not mixed with each other as such but only combined prior to use. In a second option of the coating material system of the invention, conversely, the aforementioned components may also be mixed wholly or at least partly with one another. Where the components are at least partly mixed with one another, this means that, for example, component (C) is mixed with component (A), while component (B) is present separately from this mixture of (A) and (C). Optionally, however, component (B) may also be mixed with a portion of component (C). Furthermore, the mixtures of (A) and (C) and of (B) and (C) may additionally comprise at least one optional component such as a solvent, for example.

Component (A) comprises at least one polyhydroxy group-containing compound and component (B) comprises at least one polyisocyanate-containing compound. Component (C), by contrast, is at least one bismuth-containing catalyst according to general formula (I) as defined below. Further components which may be present in the coating material system of the invention include, for example, hydroxyl-containing compounds (B), coating additives (F), pigments (H) and/or solvents (J).

A further subject of the present invention, then, is a method for producing polyurethanes which are obtained by curing of the coating material system described above. "Curing" (cure) in the sense of the present invention means that the components (A) and (B) present in the coating material system of the invention react with one another in the presence of the catalyst of component (C) to form a polyurethane. The reaction, i.e., the curing, may proceed at least partially, but preferably there is complete curing, meaning that the components (A) and (B) present in the coating material system of the invention undergo complete or near-complete reaction with one another.

Further subjects of the present invention, accordingly, are also methods for producing the coating material system of the invention. Moreover, the use of the coating material system of the invention, or of the polyurethane which has been produced from the coating material system of the invention, as, for example, a coating material, more particularly as a clearcoat or as a pigmented paint, is a subject of the present invention.

A further subject of the present invention is a method for producing a coating using the coating material system of the invention.

The preparation of polyurethanes by reaction of a compound having at least two hydroxyl groups per molecule with a compound having at least two isocyanate groups per molecule is well known as such. Depending on the reactivity of the compounds in question, it is entirely possible for spontaneous and/or partial curing (reaction of the two reactant components) to take place purely by simple mixing of the respective reactant components. For technical reasons, however, spontaneous reaction is to be suppressed, in order to ensure safe operation. In order to allow the reaction to then proceed with sufficient rapidity, however, catalysts are generally used to enhance the reactivity and/or to provide final properties of the cured film in an appropriate time frame.

Specific preparation of the polyurethane, however, takes place generally in the presence of an appropriate catalyst. In view of the reactivity of the two reactant components of the polyurethane, it is very widespread practice for the reactant components in question to be provided separately from one another, with the catalyst optionally having been possibly added beforehand to the hydroxyl-containing reactant and/or to the isocyanate group-containing reactant. Such systems are widespread in the art under the title "Two component (polyurethane) systems" (2K systems) and are also available commercially as such. Also conceivable are multicomponent systems with more than two components; it may be the case that one component is not compatible with one or the other component, and that therefore these three components cannot be brought together until directly before application.

An alternative possibility is the provision of one-component systems (mixtures/1K system) in which, for example, the two reactive components and also the catalyst can be provided as a storable mixture by means of blocking of the reactive groups of the individual reactants, as for example by blocking of the free isocyanate groups with suitable blocking agents. In the case of the 1K system, in the individual starting components or optionally in the starting mixture, there are, in practice, frequently other components present as well, such as solvents or coatings additives.

It is also known that polyurethanes, as coating materials or as a constituent of coating materials, in automotive refinish, for example, have a broad field of application. The polyurethane thus acts as a coating material. The corresponding formulations which comprise at least the polyurethane reactants and also a suitable catalyst, and optionally further components such as coatings additives or solvents, are also referred to as a coating material system or coating material composition.

Polyurethane coating materials, then, typically comprise a catalyst, for which not only acidic compounds but also, in particular, tertiary amines and/or metal compounds are applied, such as various tin compounds, more particularly dibutyltin dilaurate and dibutyltin oxide, for example.

In coating materials as well, the use of tin-containing catalysts is to be avoided, owing to the inherent toxicity of many alkyl-tin compounds. Dibutyltin oxide (DBTO) and dibutyltin dilaurate (DBTL) have been categorized accordingly by the EU Commission "Working Group on Classification and Labelling".

WO 2018/169018 relates to coating material systems based on catalysts containing both lithium and bismuth as metal components. Those catalysts are based on two salts of an aliphatic monocarboxylic acid containing at least four carbon atoms, wherein the first salt contains bismuth as metal component and the second salt contains magnesium, sodium, potassium or calcium as metal component. The respective aliphatic monocarboxylic acid may be branched and/or substituted, but it is preferably linear and unsubstituted. Examples of monocarboxylic acids are 2-ethylhexanoic acid, n-octanoic acid and neodecanoic acid, which are applied as the corresponding salts within the coating material system according to WO 2018/069018. Further mandatory components of said coating material system are at least one polyhydroxy group-containing compound and at least one polyisocyanate-containing compound.

A comparable coating material system is disclosed in WO 2016/120160, which differs from the one disclosed in WO 2018/069018 in respect of the catalyst applied. The catalyst according to WO 2016/120160 is a catalyst comprising both lithium and bismuth as metal components in a ratio of at least 7:1 (mol/mol). The catalyst can be obtained by mixing the respective metal components with organic acids having (long chain) carboxylic acids with 2 to 30 carbon atoms. However, neither WO 2016/120160 nor WO 2018/069018 discloses any bismuth-containing catalysts according to the present invention with at least one aromatic substituent such as those according to the ligands of formula (II) of the present invention.

U.S. Pat. No. 4,584,362 discloses a bismuth catalyst system for preparing polyurethane elastomers. The polyurethane elastomers are obtained by reacting a polyether or polyester polyol with a polyisocyanate in the presence of a catalytic amount of a bismuth salt of a carboxylic acid having from 2 to 20 carbon atoms. A similar disclosure can be found in U.S. Pat. No. 4,742,090 in respect of the production of polyurethane-urea elastomers. The bismuth carboxylate applied therein as catalyst comprises, among others, a bismuth salt of neodecanoic acid.

WO 00/47642 also discloses bismuth carboxylates as catalysts, wherein the respective carboxylic acid is based on a hydrocarbon chain of 11 to 36 carbon atoms and having a molecular weight in the range of from 165 to 465. The catalysts are applied for producing cross-linked block isocyanate waterborne coatings.

It was an object of the present invention, therefore, to provide a new coating material system.

The object is achieved by means of a coating material system comprising components (A) to (C):

(A) at least one polyhydroxy group-containing compound,
(B) at least one polyisocyanate-containing compound, and
(C) at least one bismuth-containing catalyst according to general formula (I)

   (I)

in which the variables are defined as follows:

$R^1$ is mutually independently a radical of the general formula (II)

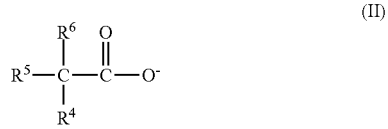   (II)

and x is 1, 2 or 3;

$R^2$ is mutually independently a radical of the general formula (III)

   (III)

and y is 0, 1 or 2;

X is mutually independently hydroxyl, halogen, carbonate, hydrogencarbonate or $R^7$ and z is 0, 1 or 2;

wherein the sum total of x, y and z is equal to 3;

$R^3$ is unsubstituted or at least monosubstituted $C_1$-$C_{30}$-alkyl, $C_6$-$C_{14}$-aryl or $C_7$-$C_{30}$-aralkyl, wherein the substituents are selected from hydroxyl, halogen, carboxyl, —$CF_3$, —$NH_2$, $C_1$-$C_6$-alkoxy, $C_1$-$C_{30}$-alkyl or $C_6$-$C_{14}$-aryl and the alkyl and aryl fragments of these substituents may in turn be at least monosubstituted by hydroxyl, halogen, —$CF_3$, —$NH_2$ or $CO_1$—$CO_6$-alkoxy, and wherein the carbon atom of the radical $R^3$ bonded directly to the carbon atom of the carboxyl group of the general formula (III) does not comprise any unsubstituted or at least monosubstituted $C_6$-$C_{14}$-aryl as substituent, $R^4$, $R^5$ and $R^6$ are mutually independently unsubstituted or at least monosubstituted $C_1$-$C_{30}$-alkyl, $C_6$-$C_{14}$-aryl or $C_7$-$C_{30}$-aralkyl, wherein the substituents are selected from hydroxyl, halogen, carboxyl, —$CF_3$, —$NH_2$, $C_1$-$C_6$-alkoxy, $C_1$-$C_{30}$-alkyl or $C_6$-$C_{14}$-aryl and the alkyl and aryl fragments of these substituents may in turn be at least monosubstituted by hydroxyl, halogen, —$CF_3$, —$NH_2$ or $C_1$—$CO_6$-alkoxy, and wherein at least one of the radicals $R^4$, $R^5$ or $R^6$ is unsubstituted or at least monosubstituted $C_6$-$C_{14}$-aryl, $R^7$ is unsubstituted or at least monosubstituted $C_1$-$C_{30}$-alkyl, $C_6$-$C_{14}$-aryl or $C_7$-$C_{30}$-aralkyl, wherein the substituents are selected from hydroxyl, halogen, carboxyl, —$CF_3$, —$NH_2$, $C_1$-$C_6$-alkoxy, $C_1$-$C_{30}$-alkyl or $C_6$-$C_{14}$-aryl and the alkyl and aryl fragments of these substituents may in turn be at least monosubstituted by hydroxyl, halogen, —$CF_3$, —$NH_2$ or $C_1$—$CO_6$-alkoxy, and wherein i) components (A), (B), and (C) are present separately from one another or ii) are mixed wholly or at least partly with one another.

Among the features of the coating material system of the invention are that the use of toxic, tin-containing catalysts can be avoided and/or that rapid curing is ensured.

An advantage of the present invention can also be seen in the fact that the catalysts applied within the coating material systems according to the present invention have a catalytic activity, which is comparable to the known tin-containing catalysts. However, the catalytic activity of the catalysts applied within the present invention is better than the respective activity of bismuth-containing catalysts according to the prior art, such as catalysts based on bismuth neodecanoate.

Beyond that, the catalysts applied within the present invention show an improved potlife compared to bismuth-containing catalysts according to the prior art as well as an improved hydrolysis stability.

The more bulky the anionic ligand of the catalyst according to general formula (I) is, the better the hydrolytic stability of the respective catalyst. For example, catalysts with a quaternary α-carbon atom (i. e., the α-carbon atom does not contain any hydrogen as substituent such as the residue $R^1$) have a better hydrolytic stability than the corresponding catalyst with, for example, a secondary or tertiary α-carbon atom (i.e., the residue $R^2$ is present and $R^3$ is, for example, ethyl or isopropyl).

Furthermore, it has surprisingly been found that the coating material systems, when using polyhydroxy group-containing compounds having acid numbers of not more than 9 mg KOH/g, cure more rapidly than comparable coating material systems which comprise polyhydroxy group-containing compounds having higher acid numbers.

A further advantage of the coating material systems of the invention is to be seen in their use for automotive refinishing and for the coating of commercial vehicles. The coating material systems of the invention ensure good assembly strength after just a very short time. As a result, rapid curing is ensured even under the conditions of refinishing and of the finishing of commercial vehicles—that is, after curing at 60° C. for just 30 minutes, curing is already at such an advanced stage that initial assembly work or demasking operations can be carried out without damage to the coating.

A further advantage in connection with one embodiment of the present invention can be seen in case at least one mercapto group-containing compound (K) is used as an additional (optional) compound within the coating material system according to the present invention comprising the components (A) to (C) and optionally at least one further component such as the components (D) to (J) as defined below. The additional presence of at least one mercapto group-containing compound (K) provides a proper balance between potlife on the one hand and curing of the coating material system of the present invention on the other hand.

Another advantage of the present invention can be seen in the fact that the inventive coating material system is especially useful for low bake reactions. Low bake may be present for refinishing purposes and also plastic applications. It may also be useful for some commercial vehicle applications and also articles which are sensitive regards to heating them or cannot be heated as they are too big to cure them in an heated oven or chamber. Such applications mentioned can be general heavy duty machines or constructions.

Substrates for the application of the present invention may be steel or other metals, glass, wood, wood-composites and plastics.

For the purposes of the present invention, the terms "binder content" or "binder fraction" and "binder content determination" refer (unless stated otherwise) to the following:

The "binder content" is in each case the fraction of the coating material system that is soluble in tetrahydrofuran (THF), said system comprising components (A) to (C) and also, optionally, (D) to (K). The binder content is determined before the components of the coating material system begin to cure, in other words before curing to give the polyurethane. For the determination, the individual components of the coating material system in question are mixed completely with one another and then a small sample (P) of 1 g of the coating material system is weighed out and dissolved in 100 times the amount of THF, insoluble constituents are removed by filtration, the THF is evaporated off, and then the resulting solids content of the constituents previously dissolved in THF is ascertained by drying at 130° C. for 60 minutes, cooling in a desiccator, and then reweighing. The residue corresponds to the binder content of the sample (P).

For the purposes of the present invention, definitions such as $C_1$-$C_{30}$-alkyl, as defined above for, for example, the radical $R^4$ in formula (II), mean that this substituent (radical) is an alkyl radical having from 1 to 30 carbon atoms, whereby optionally present substituents are not considered in the number of carbon atoms. The alkyl radical can be either linear or branched or optionally cyclic. Alkyl radicals which have both a cyclic component and a linear component likewise come within this definition. The same applies to other alkyl radicals such as a $C_1$-$C_6$-alkyl radical or a $C_1$-$C_{12}$-alkyl radical. Examples of alkyl radicals are methyl, ethyl, n-propyl, sec-propyl, n-butyl, sec-butyl, isobutyl, 2-ethylhexyl, tert-butyl (tert-Bu/t-Bu), pentyl, hexyl, heptyl, cyclohexyl, octyl, nonyl or decyl.

For the purposes of the present invention, the term "aryl" or the term "$C_6$-$C_{14}$-aryl", as defined above for, for example, the radical $R^4$ in formula (II), means that the substituent (radical) is an aromatic. The respective aromatic has from 6 to 14 carbon atoms, whereby optionally present substituents are not considered in the number of carbon atoms. The aromatic can be a monocyclic, bicyclic or optionally polycyclic aromatic. In the case of bicyclic or polycyclic aromatics, individual rings can optionally be fully or partially saturated. Preferably, all rings of the respective aromatic are completely unsaturated. Preferred examples of aryl are phenyl, naphthyl or anthracyl, in particular phenyl.

For the purposes of the present invention, the definition "$C_7$-$C_{30}$-aralkyl", as defined above for, for example, the radical $R^4$ in formula (II), means that the substituent (radical) contains an alkyl radical (such as $C_1$-$C_6$-alkyl according to the above-mentioned definitions), whereby this alkyl radical in turn is substituted with an aryl radical (according to the above-mentioned definitions). The respective aralkyl substituent has from 7 to 30 carbon atoms, whereby optionally present substituents are not considered in the number of carbon atoms. The alkyl radical itself, which is contained therein, can be either linear or branched or optionally cyclic.

For the purposes of the present invention, the term "$C_1$-$C_6$-alkoxy", as defined above, for example, as (additional) substituent of the radical $R^4$ in formula (II), means that it is a substituent (radical) which is derived from an alcohol. Therefore, the respective substituent contains an oxygen fragment (—O—), which in turn is connected with an alkyl rest, such as $C_1$-$C_6$-alkyl (according to the above-mentioned definitions). The alkyl rest itself can be either linear or branched or optionally cyclic.

For the purposes of the present invention, the term "halogen", as defined above for, for example, the radical X in formula (II), means that the substituent (radical) is fluorine, chlorine, bromine or iodine, preferably halogen is fluorine or chlorine, particularly preferably halogen is chlorine.

For the purposes of the present invention, the term "unsubstituted or at least monosubstituted $C_1$-$C_{30}$-alkyl, $C_6$-$C_{14}$-aryl or $C_7$-$C_{30}$-aralkyl", as defined above for, for example, the radical $R^4$ in formula (II), means that each of the overall three specified substituents (radicals) can either be present in unsubstituted form or disposes of at least one further substituent (monosubstituted), according to their definitions already mentioned above. If one or more substituents (for example bi-substituted, tri-substituted or even higher substituted) are present, the respective substituents are selected independently of one another from the groups of substituents indicated in each case.

In case of a bi-substituted $C_6$-$C_{14}$-aryl, for example, the respective aryl component, such as phenyl, can be substituted, for example, with a hydroxy and a $C_1$-$C_{30}$-alkyl substituent, such as methyl or ethyl. Alkyl fragments or aryl fragments themselves can in turn contain at least one additional substituent according to the indicated definitions. The substitution can take place at every random position of the respective fragment.

It must be pointed out that both the bismuth-containing catalyst according to general formula (I) contain the respective substituents (radicals/residues) such as $R^1$ three times each since each bismuth-containing catalyst contains one bismuth atom (metal or central atom), which is surrounded by three individual carboxy-containing ligands. By consequence, each of those three carboxy group-containing ligands may have the same definition or a different definition falling under the general formula (I), respectively.

Provided that an appropriate radical, such as $R^4$ for example, owing to the definition of, for example, formula (I), may occur two or more times in connection with formula (II), the individual radicals $R^4$ may be selected completely independently of one another according to the respective definitions. For example, if in the general formula (I) the variable x=3, the radical $R^1$ occurs in total three times in the general formula (I). The radical $R^1$, which in turn comprises the radical $R^4$, can therefore be present three times independently of one another in this scenario. The individual radicals $R^1$ can therefore be configured differently according to their basic definition. Thus, it is feasible that a first radical $R^1$, with regard to the constituent of the radical $R^4$ necessarily present therein, has a definition other than the corresponding second and/or third radical $R^1$. Unless otherwise stated in the following text, this logically applies also for all other radicals, such as $R^2$, $R^3$, $R^5$ and/or $R^6$.

In the context of the present invention, it is preferred that each bismuth-containing catalyst contains identical ligands in respect of the definition of the radical $R^1$. By consequence, within this embodiment, each ligand contains three times the same residues $R^4$ to $R^6$ in case of a compound falling under the general formula (Ia).

Furthermore, it must be pointed out that the bismuth-containing catalysts according to general formula (I) depicted in their salt forms. Salt form means that the bismuth central atom is shown as a (three times positively charged) cation of the respective salt, whereas the three ligands $R^1$, $R^2$ and X are depicted as one-time negatively charged anions each. Usually, the negative charge of the ligand is localized within said three ligands such as a carboxy group and/or the respective ligand is in close local neighborhood to the (three times positively charged) bismuth central atom.

From a scientific point of view, it is also acceptable to choose a notation/depiction for the bismuth-containing catalysts according to the present invention in which a chemical bond between the bismuth central atom and the three ligands according to general formula (I) is fully or at least partially developed in each case, instead of the notation for salts, which was used within the scope of the present invention. In other words, this means that the bismuth central atom is not present as positively charged cation, and the respective ligands are not present as negatively charged anions either, but instead the respective charge develops a chemical bond between the respective ligands on the one hand and the bismuth central atom on the other hand. Therefore, within the scope of the present invention, such a definition, which is not based on a salt, also describes the disclosed bismuth-containing catalysts.

As Bi is a relatively big atom, further ligands may be present additionally to the aforementioned acids. Alcohols and mercaptanes are known that they can easily build complexes with several metals as like Bi Unless otherwise specified in the subsequent description, the unsubstituted definitions of the respective definitions of the radicals $R^1$ to $R^7$ are preferred.

The coating material system of the invention and the other subjects of the present invention are defined in more detail hereinbelow.

The first subject of the present invention is the coating material system already set out above, comprising components (A) to (C) and, optionally, a further component (D) to (K).

The coating material system of the invention comprises as its component (A) at least one polyhydroxy group-containing (polyhydroxyl group-containing) compound. As polyhydroxy group-containing compound of component (A) it is possible to use all compounds known to the skilled person that have at least two hydroxyl groups per molecule. The number of hydroxyl groups (hydroxy groups) per molecule may be arbitrarily high; it is specified by way of the hydroxy number (OH number), as described hereinafter. The compounds of component (A) are also referred to as "polyols"; they may be oligomeric and/or polymeric. As component (A) it is therefore also possible to use mixtures of two or more oligomeric and/or polymeric polyols (polyhydroxy group-containing compounds).

The polyhydroxy group-containing compounds of component (A) preferably have mass-average molecular weights $M_W \leq 500$ daltons, more particularly $M_W \leq 1000$ daltons. The $M_W$ can be determined by means of gel permeation chromatography (GPC) against a polystyrene standard (see also below in the experimental section). Further preferred are mass-average molecular weights $M_W$ of between 1000 and 20 000 daltons, more particularly between 1500 and 10 000 daltons.

The polyols preferably have an OH number of 30 to 400 mg KOH/g (polyol), more particularly between 100 and 300 KOH/g. The hydroxyl number (OH number) indicates how many mg of potassium hydroxide are equivalent to the amount of acetic acid bound by 1 g of substance (polyol) in the acetylation (of the corresponding polyol with acetic acid). For the determination, the sample is boiled with acetic anhydride-pyridine and the acid formed is titrated with potassium hydroxide solution (DIN 53240-2 (2007-11)). In the case of pure poly(meth)acrylates, the OH number may also be determined with sufficient precision by calculation on the basis of the OH-functional monomers applied.

It is preferred, moreover, for the polyols to have an acid number of between 0 and 30 mg KOH/g. With preference the acid number of the polyhydroxy group-containing compound of component (A) is not more than 9 mg KOH/g of the corresponding polyhydroxy group-containing compound, preferably not more than 7 mg KOH/g of the corresponding polyhydroxy group-containing compound, more particularly 0.5 to 5 mg KOH/g of the corresponding polyhydroxy group-containing compound.

The acid number here indicates the number of mg of potassium hydroxide consumed in the neutralization of 1 g of the respective compound (polyol/polyhydroxy group-containing compound) (DIN EN ISO 2114:2006-11).

If the polyols have a low acid number, preferably of not more than 9 mg KOH/g of the corresponding polyhydroxy group-containing compound, it is preferable for the polyol in question i) to be based on monomers which have completely esterified acid functions, these monomers preferably being purified prior to their use; ii) to be based on monomers which have only a small amount of free acid functions, or none, the monomers preferably comprising no acid group-containing monomers, more particularly no acrylic acid or no methacrylic acid; and/or iii) to be based on monomers which comprise no phosphate group-containing monomers ($PO_4$-containing monomers). With preference all three of the aforesaid options are realized.

The glass transition temperatures ($T_G$ values) of the polyols, measured by means of DSC measurements according to DIN EN ISO 11357-2:2011-04-28, may take on any desired values, and are preferably between −150 and 150° C., more preferably between 40 and 120° C.

Preferred polyhydroxy group-containing compounds (polyols) are polyester polyols, polyurethane polyols, polysiloxane polyols, polyacrylate polyols and/or polymethacrylate polyols. Examples of such compounds are listed in Poth, Schwalm, Schwarz: Acrylatharze. Vincentz Verlag Hannover, ISBN: 9783866308718. The aforesaid classes of polymer such as polyacrylate polyols or polymethacrylate polyols may all be used in each case as a homopolymer or as a copolymer (chain-growth copolymer) of at least two different monomers. In the context of the present invention, copolymers are used with preference as polyhydroxy group-containing compounds, particularly in the aforesaid classes of polymer. The classes of polymer are based on at least one hydroxy group-containing monomer building block. Monomers (monomer building blocks) suitable for the particular class of polymer are known to the skilled person. The skilled person also knows the specific (polymerization) processes that can be used for producing the respective polymers from the corresponding monomers. Furthermore, there may also be mixtures of at least two different specific polymers of one class of polymer, and/or mixtures of in each case at least one specific polymer from at least two different classes of polymer, present. It is also possible for copolymers to be present, these being polymers comprising fragments which can be assigned to two or more classes of polymer.

Suitable polyester polyols are described in EP-A-0 994 117 and EP-A 1 273 640, for example. Polyurethane polyols are prepared preferably by reaction of polyester polyol prepolymers with suitable di- or polyisocyanates and are described in EP-A 1 273 640, for example. Suitable polysiloxane polyols are described in WO-A-01/09260, for example, where the polysiloxane polyols recited therein may be applied preferably in combination with further polyols, more particularly those having higher glass transition temperatures.

Component (A) more preferably comprises one or more polyacrylate polyols and/or polymethacrylate polyols. The two aforesaid polymers or classes of polymer are also referred to as poly(meth)acrylate polyols. Together with the polyacrylate polyol(s) and/or polymethacrylate polyol(s) it is possible for further oligomeric and/or polymeric polyhydroxyl group-containing compounds to be used, examples being polyester polyols, polyurethane polyols, and polysiloxane polyols, more particularly polyester polyols.

The poly(meth)acrylate polyols used with more preference as component (A) in accordance with the invention are based preferably on at least one of the monomers (monomer building blocks) listed below. More preferably for this purpose is the use of at least one of the following hydroxyl-containing monomer building blocks and optionally at least one of the following monomer building blocks which are not hydroxyl-containing monomer building blocks. Applied with particular preference are copolymers based on at least one hydroxyl-containing monomer building block and at least one monomer building block which contains no hydroxyl groups. Examples of the corresponding monomer building blocks are listed below.

Hydroxyl-containing monomer building blocks used for the poly(meth)acrylate polyols are preferably hydroxyalkyl acrylates and/or hydroxyalkyl methacrylates. They are preferably selected from 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate and/or 4-hydroxybutyl methacrylate. Particularly preferred are the hydroxyl-containing monomer building blocks 4-hydroxybutyl acrylate and/or 4-hydroxybutyl methacrylate. The hydroxyl-containing monomer building blocks are used preferably at 20 to 60 wt %, based on the total monomer amount for the respective polymer.

Further monomer building blocks used for the poly(meth)acrylate polyols are preferably alkyl acrylates and/or alkyl methacrylates. They are preferably selected from methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate, lauryl methacrylate, cycloalkyl acrylates and/or cycloalkyl methacrylates. Preferred cycloalkyl (meth)acrylates are cyclopentyl acrylate, cyclopentyl methacrylate, isobornyl acrylate, isobornyl methacrylate, or, in particular, cyclohexyl acrylate and/or cyclohexyl methacrylate. Where the above monomers are used, they are applied preferably in amounts of 35 to 80 wt %, based on the total monomer amount.

Further monomer building blocks used for the poly(meth)acrylate polyols may be vinylaromatic hydrocarbons, such as vinyltoluene, alpha-methylstyrene, or in particular, styrene, amides or nitriles of acrylic or methacrylic acid, vinyl esters or vinyl ethers, and also acrylic and/or methacrylic acid. If vinylaromatic hydrocarbons are used as monomers, they are applied preferably in amounts of 0.1 to 40 wt %, based on the total monomer amount. If acrylic and/or methacrylic acid is used, this is done preferably in amounts of 0.1 to 5 wt %, based on the total amount of the monomers used.

Furthermore, it is possible to use monomer building block compounds which possess a phosphate group. They are prepared by reaction of suitable hydroxyl-containing (meth)acrylic compounds by transesterification.

Such monomers are represented preferably by the general formula (I):

$$(R')_2C{=}C(R')(-COO-R''-O-P(O)(-OR)_2) \qquad (1)$$

where R'=H or CH$_3$
R''=alkyl or alkyl-O-alkyl, and
R'''=H or alkyl.

In the aforesaid radicals R', R'', and R''', alkyl may be branched or unbranched and may optionally be cyclic. The term "alkyl" refers to saturated hydrocarbon radicals having at least one carbon atom, such as methyl (C$_1$ alkyl), ethyl (C$_2$ alkyl), or hexyl (C$_6$ alkyl). There is in principle no limit on the number of carbon atoms; preferably there are not more than 18 C atoms per alkyl. If present, such monomers are used in amounts of 0.1 to 20 wt %, based on the total monomer amount. Monomers of these kinds are available commercially, in the form for example of Sipomer PAM® from Rhodia Solvay Group.

The poly(meth)acrylate polyols particularly preferred as component (A) in accordance with the invention are preferably copolymers and preferably have mass-average molecular weights Mw of between 1000 and 20 000 daltons, more particularly between 1500 and 10 000 daltons, measured in each case by means of gel permeation chromatography (GPC) against a polystyrene standard.

The glass transition temperature of the poly(meth)acrylate polyols is generally between −150 and 150° C., more particularly between −40 and 120° C. (measured by means of DSC measurements according to DIN-EN-ISO 11357-2:2011-04-28).

The poly(meth)acrylate polyols preferably have an OH number of 60 to 250 mg KOH/g (polyol), more particularly between 70 and 200 mg KOH/g.

It is preferred, moreover, for the poly(meth)acrylate polyols to have an acid number of between 0 and 30 mg KOH/g. With preference the acid number of the poly(meth)acrylate polyols of component (A) is not more than 9 mg KOH/g of the corresponding poly(meth)acrylate polyols, preferably not more than 7 mg KOH/g of the corresponding poly(meth)acrylate polyols, more particularly 0.5 to 5 mg KOH/g of the corresponding poly(meth)acrylate polyols.

The acid number here indicates the number of mg of potassium hydroxide consumed in the neutralization of 1 g of the respective compound (poly(meth)acrylate polyols) (DIN EN ISO 2114:2006-11).

If the poly(meth)acrylate polyols which are used as component (A) have a low acid number, preferably an acid number of not more than 9 mg of KOH per gram of the corresponding poly(meth)acrylate polyols, it is preferred for the corresponding poly(meth)acrylate polyol to be based on the following monomeric building blocks (the weight percentage figures are based in each case on the total monomer amount in the polymer in question):

20 to 60 wt % of at least one hydroxyalkyl acrylate or hydroxyalkyl methacrylate (as defined above), 35 to 80 wt % of at least one alkyl acrylate or alkyl methacrylate (as defined above), and 0 to 40 wt %, preferably 0.1 to 40 wt %, of at least one vinylaromatic hydrocarbon (as defined above), preferably of styrene.

In connection with the above-recited poly(meth)acrylate polyols having a low acid number, it is further preferred that they are prepared using only a very small amount (not more than 0.5 wt %), or none, of monomers which possess a free acid function and/or which comprise a phosphate group. In this connection, more particularly, only small amounts, or none, are used of monomers selected from acrylic acid, methacrylic acid, or phosphate group-containing monomers of the above-described general formula (1).

In the coating material system of the invention, component (A) may be present in principle in any desired proportions known to the skilled person. The proportion of component (A) is preferably from 30 to 80 wt %, more preferably from 50 to 70 wt %, based in each case on the binder content of the coating material system.

The coating material system of the invention comprises as its component (B) at least one polyisocyanate-containing compound. The polyisocyanate-containing compound which can be used includes all of the compounds known for this purpose to the skilled person (see, for example, in Ulrich Meier-Westhues: Polyurethane. Lacke, Kleb- and Dichtstoffe. Vincentz-Verlag, ISBN: 9783866308961, April 2007). Suitability as component (B) is possessed, for example, by substituted or unsubstituted aromatic, aliphatic, cycloaliphatic and/or heterocyclic polyisocyanates that are known per se.

Examples of preferred polyisocyanate-containing compounds are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylylene diisocyanates (TMXDI; commercially available for example as TMXDI® from American Cyanamid), and mixtures of the aforementioned polyisocyanates. TMXDI is also referred to as m-TMXDI; bisisocyanatopropylbenzene; m-phenyldimethyl diisocyanate; m-tetramethylxylylene diisocyanate; tetramethyl-m-xylylene diisocyanate; 1,3-bis(2-isocyanato-2-propyl)benzene or 1,3-bis(alpha-isocyanatoisopropyl) benzene.

Preferred polyisocyanate-containing compounds are also the biuret dimers and iminooxadiazinediones of the aforementioned diisocyanates. Also preferred are 1,6-hexamethylene diisocyanate (HMDI), isophorone diisocyanate (IPDI), and 4,4'-methylenedicyclohexyl diisocyanate, the biuret dimers thereof and/or the iminooxadiazinediones thereof and/or the asymmetrical trimers thereof, such as the asymmetric HDI trimer with fractions of asymmetrical trimers that is obtainable commercially under the name Desmodur N3900. However, symmetrical trimers of the beforementioned compounds may be employed as well.

More preferred polyisocyanate-containing compounds are selected from 1,6-hexamethylene diisocyanate, isophorone diisocyanate, 4,4'-methylenedicyclohexyl diisocyanate, the biuret dimers of the aforementioned diisocyanates, the iminooxadiazinediones of the aforementioned diisocyanates and/or the trimers of the aforementioned diisocyanates. The trimers comprise the respective asymmetrical trimers and the respective symmetrical trimers.

In another embodiment of the invention, the polyisocyanates are polyisocyanate prepolymers having urethane structural units, which are obtained by reaction of polyols with a stoichiometric excess of aforementioned polyisocyanates. Polyisocyanate prepolymers of this kind are described in U.S. Pat. No. 4,598,131, for example.

Polyisocyanate-containing compounds of component (B) may be present in a suitable solvent (J), as further set out later on below in connection with the solvent (J) and also with the production method for the coating material system of the invention.

If the coating material system of the invention is to be provided as a one-component system (1K system), then preference is given to selecting polyisocyanate group-containing compounds (B) whose free isocyanate groups are blocked with blocking agents. The isocyanate groups may for example be blocked with substituted pyrazoles, more particularly with alkyl-substituted pyrazoles such as 3-methylpyrazole, 3,5-dimethylpyrazole, 4-nitro-3,5-dimethylpyrazole, or 4-bromo-3,5-dimethylpyrazole. Particular preference is given to blocking the isocyanate groups of component (B) with 3,5-dimethylpyrazole. For the formation of polyurethanes (crosslinked urethanes), the polyisocyanates thus blocked are reacted with (further) components (A) at elevated temperature, with a network structure being built up for example by transurethanization and release of the blocking component. At the temperatures prevailing, the blocking agent may optionally escape wholly or partly, or else may remain entirely within the coating film as a further component.

Component (B) in the coating material system of the invention may be present in principle in any desired amounts known to the skilled person. The proportion of component (B) is preferably from 20 to 50 wt %, more preferably from 25 to 40 wt %, based in each case on the binder content of the coating material system.

It is preferred, moreover, for the weight fractions of component (A) and of component (B) in the coating material system of the invention to be selected such that the molar equivalents ratio of the hydroxyl groups of the polyhydroxyl group-containing compounds of component (A) to the isocyanate groups of the polyisocyanate-containing compound of component (B) is between 1:0.9 and 1:1.5, preferably between 1:0.9 and 1:1.2, more preferably between 1:0.95 and 1:1.1. If there is also a hydroxyl group-containing compound of component (D) present in the coating material system of the invention, then its proportion in terms of the aforesaid molar equivalents ratios is taken into account in the weight fraction of component (A). In other words, in this scenario, the sum total of the hydroxyl groups of the polyhydroxy group-containing compound of component (A) and the hydroxyl-containing compound of component (D) is to be taken into account.

The coating material system of the invention comprises as its component (C) at least one bismuth-containing catalyst according to general formula (I).

(I)

in which the variables are defined as follows:
$R^1$ is mutually independently a radical of the general formula (II)

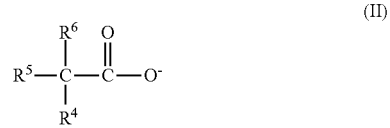

(II)

and x is 1, 2 or 3;
$R^2$ is mutually independently a radical of the general formula (III)

(III)

and y is 0, 1 or 2;
X is mutually independently hydroxyl, halogen, carbonate, hydrogencarbonate or $R^7$ and z is 0, 1 or 2;
wherein the sum total of x, y and z is equal to 3;
$R^3$ is unsubstituted or at least monosubstituted $C_1$-$C_{30}$-alkyl, $C_6$-$C_{14}$-aryl or $C_7$-$C_{30}$-aralkyl,
  wherein the substituents are selected from hydroxyl, halogen, carboxyl, —$CF_3$, —$NH_2$, $C_1$-$C_6$-alkoxy, $C_1$-$C_{30}$-alkyl or $C_6$-$C_{14}$-aryl and the alkyl and aryl fragments of these substituents may in turn be at least monosubstituted by hydroxyl, halogen, —$CF_3$, —$NH_2$ or $C_1$—$C_6$-alkoxy,
  and wherein the carbon atom of the radical $R^3$ bonded directly to the carbon atom of the carboxyl group of the general formula (III) does not comprise any unsubstituted or at least monosubstituted $C_6$-$C_{14}$-aryl as substituent;
$R^4$, $R^5$ and $R^6$ are mutually independently unsubstituted or at least monosubstituted $C_1$-$C_{30}$-alkyl, $C_6$-$C_{14}$-aryl or $C_7$-$C_{30}$-aralkyl,
  wherein the substituents are selected from hydroxyl, halogen, carboxyl, —$CF_3$, —$NH_2$, $C_1$-$C_6$-alkoxy, $C_1$-$C_{30}$-alkyl or $C_6$-$C_{14}$-aryl and the alkyl and aryl fragments of these substituents may in turn be at least monosubstituted by hydroxyl, halogen, —$CF_3$, —$NH_2$ or $C_1$-$C_6$-alkoxy,
  and wherein at least one of the radicals $R^4$, $R^5$ or $R^6$ is unsubstituted or at least monosubstituted $C_6$-$C_{14}$-aryl,
$R^7$ is unsubstituted or at least monosubstituted $C_1$-$C_{30}$-alkyl, $C_6$-$C_{14}$-aryl or $C_7$-$C_{30}$-aralkyl,
  wherein the substituents are selected from hydroxyl, halogen, carboxyl, —$CF_3$, —$NH_2$, $C_1$-$C_6$-alkoxy, $C_1$-$C_{30}$-alkyl or $C_6$—$C_{14}$-aryl and the alkyl and aryl fragments of these substituents may in turn be at least monosubstituted by hydroxyl, halogen, —$CF_3$, —$NH_2$ or $C_1$—$C_6$-alkoxy.

In connection with the radicals (substituents/ligands) present in the general formula (I), particularly the necessary radical $R^1$ and the optional radical $R^2$, it should be noted that the further/exact chemical definition of these radicals $R^1$ or $R^2$ is a result of the radicals $R^4$ to $R^6$ of the general formula (II) with respect to the radical $R^1$ and is a result of the radical $R^3$ of the general formula (III) with respect to the radical $R^2$. In accordance with the invention, the radical $R^2$ is chemically always defined differently than the radical $R^1$. Expressed in other words, this signifies that a specific radical $R^2$ or $R^3$ in accordance with general formula (III) cannot fall under the corresponding definition of a radical $R^1$ or the radicals $R^4$ to $R^6$ according to general formula (II). This results in particular from the fact that, in the chemical definition of the radical $R^2$ in accordance with general formula (III), a radical $R^3$ is present which is defined such that the radical $R^3$ is directly bonded to the carbon atom of the carbon atom of the corresponding carboxyl group of the general formula (III), no unsubstituted or at least monosubstituted $C_6$-$C_{14}$-aryl, especially no phenyl, can be present as direct substituent. In contrast, such a substituent is necessarily present for at least one of the radicals $R^4$, $R^5$ or $R^6$ in accordance with the general formula (II) in connection with the radical $R^1$. Accordingly, it is excluded that a substituent falling under the definition of the radical $R^2$ in accordance with general formula (III) can at the same time fall under the corresponding definition of the radical $R^1$ in accordance with general formula (II).

The radical $R^1$ in accordance with general formula (II) is preferably defined according to the invention such that $R^4$, $R^5$ and $R^6$ are mutually independently unsubstituted or at least monosubstituted $C_1$-$C_{12}$-alkyl or $C_6$-$C_{14}$-aryl, wherein the substituents are selected from hydroxyl, chlorine, —$CF_3$ and $C_1$-$C_6$-alkyl, and wherein at least one of the radicals $R^4$, $R^5$ or $R^6$ is unsubstituted or at least monosubstituted $C_6$-$C_{14}$-aryl. $C_6$-$C_{14}$-aryl is preferably phenyl, especially unsubstituted phenyl.

Furthermore, it is preferred in accordance with the invention that the radicals $R^4$ to $R^6$ in the general formula (II) are defined as follows:
i) $R^4$ is unsubstituted or at least monosubstituted phenyl, wherein the substituents are selected from hydroxyl, chlorine, —$CF_3$ and $C_1$-$C_6$-alkyl,
ii) $R^5$ is unsubstituted or at least monosubstituted phenyl or $C_1$-$C_{12}$-alkyl, wherein the substituents are selected from hydroxyl, chlorine, —$CF_3$ and $C_1$-$C_6$-alkyl, and
iii) $R^6$ is unsubstituted or at least monosubstituted phenyl or $C_1$-$C_{12}$-alkyl, wherein the substituents are selected from hydroxyl, chlorine, —$CF_3$ and $C_1$-$C_6$-alkyl.

With respect to the radical $R^2$ according to general formula (III), it is preferable that the radical $R^3$ present therein is unsubstituted or at least monosubstituted $C_1$-$C_{12}$-alkyl, wherein the substituents are selected from hydroxyl, chlorine or —$CF_3$.

With regard to the radical X, it is preferred in accordance with the invention that this is hydroxyl, chlorine or $R^7$ and $R^7$ is unsubstituted or at least monosubstituted $C_1$-$C_{12}$-alkyl or $C_6$-$C_{14}$-aryl, wherein the substituents are selected from hydroxyl, chlorine, —$CF_3$ and $C_1$-$C_6$-alkyl.

In the bismuth-containing catalyst according to general formula (I) according to the invention, the radicals $R^1$, $R^2$ and X present in each case can be present in each case in any combination. A precondition in this case however is that x is at least 1, i.e. at least one radical $R^1$ is present in the bismuth-containing catalyst according to the invention according to general formula (I). Furthermore, the sum total of x, y and z is 3, the total number of ligands or negative charges is 3, so that in total charge neutrality is present with respect to the 3-fold positively charged bismuth central atom. If individual ligands/radicals such as $R^1$, $R^2$ or X occur repeatedly, these can have the same or different definitions according to the respective basic definition.

In the context of general formula (I), the following scenarios are preferred in accordance with the invention, wherein
  i) x is equal to 2 or 3, y is equal to 0 or 1 and z is equal to 0 or 1, or
  ii) x is equal to 3 and y and z are each equal to 0, or
  iii) x is equal to 2, y is equal to 0 and z is equal to 1, or
  iv) x is equal to 2, y is equal to 1 and z is equal to 0,
    wherein preferably x is equal to 3 and y and z are each equal to 0.

In a preferred embodiment of the present invention, the bismuth-containing catalyst according to the general formula (I) and (II) is defined as follows:
  i) $R^4$ is unsubstituted or at least monosubstituted phenyl, wherein the substituents are selected from hydroxyl, chlorine, —$CF_3$ and $C_1$-$C_6$-alkyl,
  ii) $R^5$ is unsubstituted or at least monosubstituted phenyl or $C_1$-$C_{12}$-alkyl, wherein the substituents are selected from hydroxyl, chlorine, —$CF_3$ and $C_1$-$C_6$-alkyl,
  iii) $R^6$ is unsubstituted or at least monosubstituted $C_1$-$C_{12}$-alkyl, wherein the substituents are selected from hydroxyl, chlorine and —$CF_3$, and
  iv) x is equal to 3 and y and z are each equal to 0.

In a further preferred embodiment of the present invention, the bismuth-containing catalyst is defined as follows:
  i) $R^4$ and $R^5$ are each phenyl,
  ii) $R^6$ is $C_1$-$C_{12}$-alkyl, preferably $C_6$-$C_{10}$-alkyl, especially $C_8$-alkyl, and
  iii) x is equal to 3 and y and z are each equal to 0.

In a particularly preferred embodiment of the present invention, the bismuth-containing catalyst is defined by the general formula (Ia):

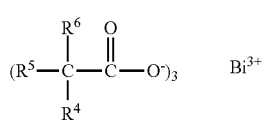

(Ia)

wherein the radicals $R^4$ to $R^6$ mutually independently correspond to the definitions described above. As evident from formula (Ia) compared to the general formula (I), the catalyst according to the invention in this embodiment has in total three radicals $R^1$ according to general formula (I). Each of these in total three radicals $R^1$ in each case comprises one radical $R^4$, one radical $R^5$ and one radical $R^6$. In each of these three radicals $R^1$, the corresponding definitions of the radicals $R^4$ to $R^6$ can be the same or different from one another. However, it is preferred in accordance with the invention that each of the total of three radicals $R^4$ are the same, each of the total of three radicals $R^5$ are the same and each of the total of three radicals $R^6$ are the same.

Furthermore, in the context of the general formula (Ia), it is preferable that
  i) $R^4$ is unsubstituted or at least monosubstituted phenyl, wherein the substituents are selected from hydroxyl, chlorine, —$CF_3$ and $C_1$-$C_6$-alkyl,
  ii) $R^5$ is unsubstituted or at least monosubstituted phenyl or $C_1$-$C_{12}$-alkyl, wherein the substituents are selected from hydroxyl, chlorine, —$CF_3$ and $C_1$-$C_6$-alkyl, and
  iii) $R^6$ is unsubstituted or at least monosubstituted $C_1$-$C_{12}$-alkyl, wherein the substituents are selected from hydroxyl, chlorine and —$CF_3$.

In the context of the general formula (Ia), it is even more preferable that
  i) $R^4$ and $R^5$ are each phenyl, and
  ii) $R^6$ is $C_1$-$C_{12}$-alkyl, preferably $C_6$-$C_{10}$-alkyl, especially $C_8$-alkyl.

The catalyst of component (C) may be present in principle in any desired amounts known to the skilled person in the coating material system of the invention. Component (C) preferably has a fraction of 35 to 2000 ppm by weight, more preferably of 35 to 1000 ppm by weight, and very preferably of 100 to 1000 ppm by weight, based in each case on the binder content of the coating material system.

The bismuth-containing catalyst according to general formula (I) can be prepared by any method known to the person skilled in the art in respect of preparing catalysts containing a metal atom such as bismuth. Usually, said bismuth-containing catalysts are obtained by reacting the corresponding acid of the anionic ligands of the bismuth-containing catalysts according to general formula (I) with a bismuth-containing compound. Instead of the before-mentioned corresponding acid, also a corresponding salt thereof may be applied. The bismuth-containing compound is preferably selected from $Bi_2O_3$, bismuth carbonate, bismuth hydrogen carbonate, bismuth halogenide, $Bi(C_6$-$C_{14}$-aryl$)_3$, $Bi(C_1$-$C_{12}$-alkyl$)_3$ or metallic bismuth.

For example, a method for preparing a bismuth-containing catalyst of the general formula (I) or of the general formula (Ia) according to the definitions above can be carried out as follows:
  i) at least one compound of the general formula (IIa)

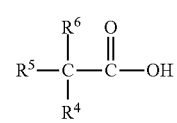

(IIa)

or a corresponding salt thereof,
    wherein the radicals $R^4$ to $R^6$ are defined according to the embodiments/definitions above,
  ii) optionally at least one compound of the general formula (IIIa)

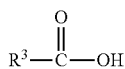

(IIIa)

or a corresponding salt thereof,
wherein the radical $R^3$ is defined according to the embodiments/definitions above, iii) is reacted with at least one bismuth-containing compound selected from $Bi_2O_3$, bismuth carbonate, bismuth hydrogencarbonate, bismuth halide, $Bi(C_6\text{-}C_{14}\text{-aryl})_3$, $Bi(C_1\text{-}C_{12}\text{-alkyl})_3$ or metallic bismuth.

The reactants listed above, i.e. the acids according to the general formulae (IIa) or (IIIa) or the appropriate corresponding salts as such, are known to those skilled in the art. The corresponding salts used can be, for example, sodium, potassium or calcium salts. Optionally, instead of the aforementioned acids according to the general formulae (IIa) or (IIIa) or corresponding salts thereof as reactants, it is also possible to use corresponding carboxylic esters, for example a methyl or ethyl ester. Such carboxylic esters can be prepared by reacting the aforementioned acids or a corresponding salt thereof with a suitable alcohol, for example methanol or ethanol, optionally in the presence of a catalyst. The appropriate preparation methods of such carboxylic esters are known to a person skilled in the art.

In principle, any bismuth-containing compound can be used in the method according to the invention, which is suitable for the purpose of forming the bismuth central atom in the bismuth-containing catalyst of the general formula (I) according to the invention, by reaction with the appropriate compound according to the general formula (IIa) or optionally (IIIa). Bismuth-containing compounds as such are known to those skilled in the art. If, in accordance with the invention, a bismuth halide is used as bismuth-containing compound, it is preferably a chlorine-containing compound, especially $BiCl_3$. Any specific substituents/substitution patterns, such as the radicals $R^4$ to $R^6$ for example, may already be present in the corresponding reactant. Optionally, such substituents/substitution patterns can also be attached or completed even after the preparation process of a bismuth-containing catalyst according to the general formula (I) described above.

Preferably, the bismuth-containing compound is selected from $Bi_2O_3$, $BiCl_3$, $Bi(C_6H_5)_3$ or metallic bismuth.

The bismuth-containing catalysts according to the general formula (I) according to the invention are preferably prepared by reacting at least one compound of the general formula (IIa) and optionally at least one compound of the general formula (IIIa) with at least one bismuth-containing compound, wherein i) the reaction is carried out under a protective atmosphere and/or in the presence of at least one solvent, especially toluene or tetrahydrofuran, and/or ii) the reaction is conducted for at least 10 hours and/or at a temperature of at least 100° C., and/or iii) following the reaction, volatile constituents are removed, the bismuth-containing catalyst is dried under reduced pressure and/or a recrystallization is carried out.

Furthermore, it is preferred in accordance with the invention that the at least one compound of the general formula (IIa) used as reactant in the method according to the invention is prepared from a corresponding compound according to the general formula (IIb), wherein the compounds according to the general formula (IIa) only differ from the corresponding compounds of the general formula (IIb) in that one or at most two radicals selected from $R^4$, $R^5$ and $R^6$ is defined as H (hydrogen) in place of the definitions listed for the compounds according to general formula (IIa). This is preferably affected by reacting a corresponding compound (IIb), but in which $R^5$ and/or $R^6$ is H, with a lithium-containing compound, especially with n-butyllithium, and the intermediate obtained in this case is subsequently reacted with a haloalkane to introduce the radicals $R^5$ and $R^6$ to obtain a compound according to the general formula (IIa). Haloalkanes used can be, for example, 1-bromooctane or 1-bromopropane. This method variant is thus used in particular if a catalyst according to the invention in accordance with general formula (I) is intended to be prepared in which at least one of the radicals $R^4$ to $R^6$, preferably precisely one of these radicals, is a $C_1\text{-}C_{30}$-alkyl. Alternatively, it is also conceivable that, instead of a haloalkane, an appropriate haloaryl or haloaralkyl compound is used if, in the context of this method step, a fully or partially aromatic substituent is intended to be introduced into the corresponding compound (IIb). Preferably, the compound according to the general formula (IIb) used is 2-arylacetic acid, 2,2-diarylacetic acid, particularly 2-phenylacetic acid or 2,2-diphenylacetic acid, particularly preferably 2,2-diphenylacetic acid.

It is preferred that the reaction is carried out under inert gas atmosphere and/or in the presence of at least one solvent, preferably selected from toluene or tetrahydrofurane. It is also preferred that the reaction takes place for at least ten hours and/or at a temperature of at least 100° C. It is also preferred that, after the reaction as such, any volatile components of the reaction product are distilled of, the bismuth-containing catalyst is dried in vacuum and/or a crystallization process is carried out.

In the coating material system of the invention there may optionally be other catalysts used additionally, apart from the above-described catalysts of component (C), these additional catalysts being known to the skilled person in connection with the preparation of polyurethanes or production of coating material systems, but not falling within the definition of the catalysts of component (C).

Examples of other catalysts according to the prior art, which may be used within the coating material system of the present invention in addition to the before-mentioned catalyst of component (C) are, for example, catalysts containing both lithium and bismuth as metal components as described in WO 2016/120160. Further catalysts are based on two salts of an aliphatic monocarboxylic acid containing at least four carbon atoms, wherein the first salt contains bismuth as metal component and the second salt contains magnesium, natrium, potassium, zinc or calcium as metal component, as described in WO 2018/069018, can also be used as additional catalysts compared to those as described before for component (C). However, it is preferred within the context of the present invention that the coating material system does not contain any additional catalyst besides those catalysts as described above according to the general formula (Ia) and/or the general formula (Ib).

As already mentioned at the outset, the above-defined components (A) to (C) may i) be present separately from one another or ii) may be mixed completely or at least partially with one another, in the coating material system of the invention. Where components (A) to (C) are present separately from one another, according to the first option, the system in question is preferably the two-component system (2K system) already mentioned above, the definition of a 2K system also comprehending those systems in which three or more different components are provided. 2K systems for the purposes of the present invention are in principle all coating material systems where components (A) and (B) are present separately from one another, in particular prior to the application of the system in question, as for example in the formation of a polyurethane or of a coating material.

This also means, however, that the coating material systems encompassed in the case of the aforementioned second option, second variant, in which the components (A) to (C) are at least partly mixed with one another, are likewise to be interpreted as a 2K system in the sense of the present invention, provided components (A) and (B) are present separately from one another. In this scenario, however, component (C) may be mixed at least partly or completely with one or both components (A) and (B).

The term "at least partly mixed with one another" has the present meaning in the context of the present invention, this meaning being illustrated exemplarily with an example. For example, component (C) is mixed with component (A), whereas component (B) is present separately to this mixture of (A) and (C). Optionally, however, it is also possible for component (B) to be mixed with a portion of component (C). Furthermore, the mixtures of (A) and (C) and also of (B) and (C) may additionally comprise at least one optional component as defined hereinafter.

Where components (A) to (C) are mixed completely with one another in the coating material system of the invention, in accordance with above-defined second option, first variant, the system in question is preferably a one-component system (1K system) as already mentioned above, in which the free isocyanate groups of component (B) are blocked preferably by suitable blocking agents.

It is possible for the individual components (A) to (C) to be provided each in portions, with individual portions possibly mixed in turn with other components, examples being the optional components described hereinafter. Preferably, however, components (A) and (B) are provided not in parts, but instead in each case as an individual (complete) component. As described above, however, the catalyst of component (C), in particular, may be at least partly mixed with one another in portions and/or in part-components of at least one of the two components (A) and/or (B). In this scenario, the catalyst of component (C) is prepared preferably in situ immediately prior to the application of the coating material system in question.

In accordance with the invention, all of components (A) to (C) and also, optionally, the optional components described below for the respective coating material system are mixed completely with one another no later than (immediately) prior to the desired application, irrespective of whether the system is a 1K system or a 2K system. Examples of (desired) applications are described in the text below. In the context of these applications, the curing of the coating material system of the invention, already described above, takes place, with formation of polyurethane, by reaction of the components (A) and (B). In view of the in some cases high reactivity of these two components, it is frequently advantageous for these components to be provided separately from one another in the context of the coating material system (i.e., prior to the desired application) (and also in connection with an increased storage stability). Consequently, the polyurethane reaction in the context of the desired application can be regulated and controlled more effectively and/or in a more targeted way.

Besides the components (A) to (C) already described above, the coating material systems of the invention may optionally further comprise at least one further component (D) to (K), which are specified hereinafter.

The optional components (D) to (K) are selected from hydroxyl-containing compounds (D), aminoplast resins and/or tris(alkoxycarbonylamino)triazines (E), coatings additives (F), pigments (H), other fillers (I), solvents (J), and/or mercapto group-containing compounds (K).

In analogy to the components (A) to (C) described above, the optional components (D) to (K) may also be present separately from one another or may be mixed wholly or at least partly with one another and/or mixed with the components (A) to (C).

As an optional component, the coating material system of the invention comprises preferably at least one further component selected from hydroxyl-containing compounds (D), coatings additives (F), pigments (H), solvents (J), and/or mercapto group-containing compounds (K).

The coating material system of the invention comprises optionally as optional component (D) at least one hydroxyl-containing compound. Hydroxyl-containing (hydroxy group-containing) compounds as such are known to the skilled person. The hydroxyl-containing compound (D) generally has two or more hydroxyl groups, preferably two hydroxyl groups. In the context of the present invention, the hydroxyl-containing compound (D) does not fall within the definition of the above-described polyhydroxy group-containing compound (A).

The hydroxyl group-containing compounds (D) are preferably monomeric compounds and/or compounds having a molecular weight <500 g/mol, preferably <200 g/mol. The hydroxyl-containing compounds (D) are also referred to as low molecular mass polyols.

Component (D), where present, has a fraction of 0.5 to 20 wt %, more preferably of 1 to 10 wt %, very preferably of 1 to 5 wt %, based in each case on the binder content of the coating material system.

Preferred examples of a hydroxyl-containing compound (D) that are used are ethylene glycol, neopentyl glycol, 1,3-butanediol, 1,2-propanediol, 1,3 propanediol, or diols of dimerized and subsequently hydrogenated natural fatty acids (trade name Sovermol® 908). Preference is given to admixing those (low molecular mass) polyols of component (D) in minor fractions of the polyol component (A)—for example, at 1 to 20 wt %, based on the amount of component (A).

The coating material system of the invention comprises optionally, as optional component (E), at least one aminoplast resin and/or at least one tris(alkoxycarbonylamino) triazine. Compounds which fall within component (E) of the present invention are known to the skilled person. Where present, component (E) has a fraction of 0.5 to 30 wt %, preferably of 0.5 to 15 wt %, based on the binder content of the coating material system.

Examples of suitable tris(alkoxycarbonylamino)triazines are specified in U.S. Pat. No. 4,939,213, in U.S. Pat. No. 5,084,541, and in EP-A 0 624 577.

Examples of suitable aminoplast resins (E) are all aminoplast resins commonly applied in the coatings industry sector, the reactivity of the aminoplast resin allowing the properties of the resulting coating materials to be controlled. The resins in question are condensation products of aldehydes, more particularly formaldehyde, and, for example, urea, melamine, guanamine, and benzoguanamine. The aminoplast resins comprise alcohol groups, preferably methylol groups, which in general are etherified partly or, preferably, completely with alcohols. Aminoplast resins etherified with lower alcohols are used more particularly. Preferred aminoplast resins used are those etherified with methanol and/or ethanol and/or butanol, examples being products available commercially under the names Cymel®, Resimene®, Maprenal®, and Luwipal®.

The aminoplast resins (E) are long-established compounds and are described for example in detail in the American patent application US 2005/0182189 A1, page 1, paragraph [0014], to page 4, paragraph [0028].

The coating material system of the invention comprises optionally, as optional component (F), at least one coatings additive. Coating additives as such are known to the skilled person. Where present, a coatings additive (F) has a fraction of 0.5 to 30 wt %, preferably of 0.5 to 25 wt %, and more particularly of 1 to 20 wt %, based in each case on the binder content of the coating material system.

Examples of suitable coatings additives (F) are:
in particular, UV absorbers such as, for example, 2-(2-hydroxyphenyl)benzotriazoles, 2-hydroxybenzo phenones, hydroxyphenyl-s-triazines, and oxalanilides;
in particular, light stabilizers such as those known as HALS compounds ("hindered amine light stabilizers"; these are derivatives of 2,2,6,6-tetramethylpiperidine; available commercially for example as Tinuvin®292 from BASF SE), benzotriazoles such as hydroxyphenylalkylbenzotriazole, or oxalanilides;
radical scavengers;
slip additives;
polymerization inhibitors;
defoamers;
reactive diluents different from components (A) and (D), more particularly reactive diluents which become reactive only through reaction with other constituents and/or with water, such as Incozol or aspartic esters, for example;
wetting agents different from components (A) and (D), such as silxoanes, fluorine-containing compounds, carboxylic monoesters, phosphoric esters, polyacrylic acids and copolymers thereof, or polyurethanes;
adhesion promoters;
flow control agents, especially those based on a polyacrylate. Applied preferably here are copolymers of ethylhexyl acrylate and ethyl acrylate. These copolymers preferably have a very low $T_G$, are relatively nonpolar, and have a low OH number;
film-forming assistants such as cellulose derivatives;
fillers in the form of nanoparticles based on silicon dioxide, aluminum oxide, or zirconium oxide; for further details, refer to Römpp Lexikon "Lacke and Druckfarben" Georg Thieme Verlag, Stuttgart, 1998, pages 250 to 252;
rheology control additives different from components (A) and (D), such as the additives known from patents WO 94/22968, EP-A-0 276 501, EP-A-0 249 201, or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers having ionic and/or associative groups such as poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes, or polyacrylates;
flame retardants.

The coating material system of the invention comprises optionally, as optional component (H), at least one pigment. Suitable pigments as such are known to the skilled person (see, for example, in Thomas Brock, Michael Groteklaes, Peter Mischke: European Coatings Handbook, Vincentz Verlag, ISBN 3-86630-849-3).

The fraction of the pigments may in principle be arbitrary; it is preferably situated within a P/B range from 0.1 to 3.0 (P/B describes the weight ratio of pigment (P) to binder (B); binder is to be understood in this case as the sum total of all film-forming components of the coating system).

In accordance with the invention, pigments are used more particularly when the aim with the coating material compositions is to produce pigmented topcoats or pigmented undercoats, more particularly pigmented topcoats.

The coating material system of the invention optionally comprises, as optional component (I), at least one other filler. Other fillers as such are known to the skilled person. Where present, the other filler (I) has a fraction of 0.1 to 30 wt %, based in each case on the binder content of the coating material system.

Examples of suitable other fillers (I) are carbonates, silicon dioxides, or barium sulfates, as they are or else in modified form. In contrast to the fillers described above as examples of coatings additives (F), the other fillers (I) are not nanoscale particles.

The coating material system of the invention optionally comprises, as optional component (J), at least one solvent. Solvents as such, especially in connection with the production of polyurethane or of coating material systems, are known to the skilled person. Where present, the solvent (J) has a fraction of 20% to 80%, preferably of 30% to 50%, based in each case on the total amount of the coating material system of the invention.

Preferred solvents used are those suitable for dissolving the polyisocyanate-containing compounds of component (B). Furthermore, the preferred solvents may also contain small amounts of alcohol and/or the preferred solvents are entirely based on at least one alcohol, preferably a low molecular weight alcohol, such as methanol, ethanol or (iso-)propanol etc.

Suitable solvents (J) are those which permit sufficient solubility of the polyisocyanate component and are free from groups reactive toward isocyanates. Examples of solvents of this kind are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, butylal, 1,3-dioxolane, glycerol formal, benzene, toluene, xylene, n-hexane, cyclohexane, Solventnaphtha®, 2-methoxypropyl acetate (MPA), and ethyl ethoxypropionate.

The coating material system of the invention optionally comprises, as optional component (K), at least one mercapto group-containing compound. Mercapto group-containing compounds as such are known to the skilled person.

The coating material system of the invention comprises as component (K) at least one mercapto group-containing compound. Mercapto group-containing compounds as such are known to the skilled person. Suitable mercapto group-containing compounds are disclosed, for example, in WO 2007/020270 or WO 2013/131835.

Where present, the mercapto group-containing compound (K) has a fraction of 0.1 wt % to 5 wt %, preferably of 0.2 wt % to 3 wt %, based in each case on the total amount of the coating material system of the invention.

Examples of mercapto group-containing compounds are 2-mercapto propionic acid, 3-mercapto propionic acid, mercapto succinic acid, 2-mercaptoacetic acid or mercapto ethanol. It has to be noted that in case the respective mercapto group-containing compound contains an acid group, the corresponding esters are also covered by the definition of a mercapto group-containing compound (K). Examples in this respect are 2-ethyl-3-mercapto propionate, 2-ethylhexyl-3-mercapto propionate, 2-ethyleneglycol-bis-3-mercapto propionate, methylthioglycolate or 2-mercaptoacetate. The respective esters are based on alcohols which can be monofunctional or multifunctional. The esterification can be such that all alcohol functions are esterified or partly esterified and will then have OH-functionality. The SH-functions of such an adduct may also be esterified, preferably the SH-function is only partially esterified, more preferably the SH-function is not esterified at all.

Preferred mercapto group-containing compounds (K) are selected from 2-mercapto propionic acid, 3-mercapto propionic acid, mercapto ethanol, 2-ethyl-3-mercapto propionate, 2-ethylhexyl-3-mercapto propionate, and 2-ethyleneglycol-bis-3-mercapto propionate.

In one embodiment of the present invention, the coating material system of the invention comprises at least one further component (D) to (K), selected from hydroxyl-containing compounds (D), aminoplast resins and/or tris(alkoxycarbonylamino)triazines (E), coatings additives (F), pigments (H), other fillers (I), solvents (J), and/or mercapto group-containing compounds (K), where
  i) the individual components (D) to (K) are present separately from one another or
  ii) are mixed wholly or at least partly with one another and/or with components (A) to (C).
It is preferred, furthermore, if
  i) the coating material system is not aqueous, and/or
  ii) components (A) and/or (B) each form a mixture with at least one solvent (J), but components (A) and (B) are present separately from one another, and/or
  iii) the catalyst of component (C) is present entirely or at least partly in at least one of the components (A) or (B) present separately from one another, preferably in component (A).

Where the coating material system is not aqueous, this means that there is preferably no water at all present in such a coating material system, or that water may occur only in the form of impurities or traces, with a maximum amount of 0.1 wt %, preferably of 0.01 wt %, more particularly of 0.001 wt %, based in each case on the total weight of the corresponding coating material system.

In a further preferred embodiment, the coating material system of the invention is present as a complete mixture of components (A), (B), and (C) and also of optionally present components (D) to (K).

In one embodiment of the present invention the coating material system comprises the following components:
  50 to 70 wt % (based on the binder content of the coating material system) of at least one polyhydroxy group-containing compound (A), preferably of at least one poly(meth)acrylate polyol,
  25 to 40 wt % (based on the binder content of the coating material system) of at least one polyisocyanate-containing compound (B),
  100 to 1000 ppm by weight (based on the binder content of the coating material system) of at least one catalyst (C),
  0 to 10 wt %, preferably 1 to 5 wt % (based on the coating material system binder content) of at least one hydroxyl-containing compound (D),
  0 to 25 wt %, preferably 1 to 10 wt % (based on the binder content of the coating material system) of at least one coatings additive (F),
  0 to 300 wt %, preferably 1 to 100 wt % (based on the binder content of the coating material system) of at least one pigment (H), and
  0 to 5 wt %, preferably 0.5 to 3.0 wt % (based on the coating material system binder content) of at least one mercapto group-containing compound (K).

In this embodiment, moreover, the coating material system of the invention may also comprise at least one solvent (J). Where a solvent is present, it is included in amounts of 1 to 80 wt %, preferably 5 to 50 wt %, of at least one solvent (J). In contrast to the other components, the solvent content is based on the overall amount of the coating material system of the invention.

A further subject of the present invention, accordingly, is also a method for producing a coating material system as described above. The production method as such is known to the skilled person. If the mandatory components and also, optionally, the optional components of the coating material system are mixed wholly or at least partly with one another, the skilled person knows how such mixing can be implemented. The sequence and/or duration of the individual mixing steps are in principle arbitrary; all of the components may optionally be mixed simultaneously with one another. Where the mandatory components, and also those present optionally of the coating material system of the invention are present separately from one another they are analogously mixed immediately before the application of the coating material system in question.

In one embodiment the method of the invention for producing a coating material system is carried out such that components (A), (B), and (C) and also the optionally present components (D) and (K) are provided separately from one another and then mixed with one another. Mixing takes place preferably at room temperature; components (A) and (C) are mixed with one another beforehand and/or a mixture comprising component (A) is added.

The aforementioned embodiment is preferably carried out immediately before the specific application of the coating material system of the invention. This means that complete mixing of all of the mandatory components (A) to (C) present in the coating material system of the invention, and also the optionally present components (D) to (K), is not achieved until immediately before the specific application of the coating material system of the invention. The term "immediately before the specific application" embraces a time span from approximately one minute up to two hours.

A further subject matter of the present invention, therefore, is also a method for producing a polyurethane by at least partly or completely curing the above-described coating material system of the invention. The polyurethane is preferably fully cured. The curing of the coating material system of the invention takes place after complete mixing of all the components of the coating material system, more particularly after the mixing of components (A) and (B). If component (B), in the context of a 1K system, is to additionally be protected (blocked) with blocking agents, the blocking agent must first of all be removed before a urethane reaction can take place to produce the polyurethane of the invention. The method for producing the polyurethane therefore takes place preferably as part of a specific application of the coating material system. The production of a polyurethane as such, and the implementation of the curing, are known to the skilled person and have also already been acknowledged in the introductory part of the present invention.

Expressed in other words, this means that the desired/ specific application of the coating material system of the invention forms polyurethane by curing of a coating material based on components (A) and (B) in the presence of the catalyst (C); the polyurethane is formed preferably in layer form or as a coating.

The curing of the coating material (system) of the invention that has been applied may also take place, however, after a certain resting time. The flash-off time serves, for example, for the flow and the degassing of the coating films, or for the evaporation of volatile constituents such as solvents. The resting time may be assisted and/or shortened by the application of increased temperatures and/or by a reduced atmospheric humidity, provided this does not entail any instances of damage or alteration to the coating films, such as premature complete crosslinking, for instance.

The thermal curing of the coating material system has no peculiarities in terms of method, but instead can take place in accordance with the customary and known methods such as heating in a forced air oven or irradiation with IR lamps. The thermal cure here may also take place in stages. Another preferred curing method is that of curing with near infrared (NIR radiation).

The thermal curing takes place advantageously at a temperature of 20 to 200° C. for a time of 1 min up to 10 h; at low temperatures, longer curing times may also be applied. For automotive refinishing and for the painting of plastics parts, and also for the painting of commercial vehicles, relatively low temperatures are usually applied, lying preferably between 20 and 80° C., more particularly between 20 and 60° C.

The polyurethane produced in accordance with the method of the invention preferably forms a layer or coating or is at least part of a layer or coating; the layer or coating is preferably a coating film.

The polyurethane preferably comprises at least one pigment (H) and/or the polyurethane is applied in layer form on a basecoat film, which optionally comprises at least one pigment (H), or on an optionally precoated substrate.

It is preferred, moreover, for the curing of the polyurethane to take place at temperatures of 20 to 200° C., preferably of 20 to 160° C., more preferably of 20 to 100° C., the optional basecoat film having optionally been dried beforehand at temperatures of 20° C. to 80° C.

A further subject of the present invention is therefore also a polyurethane which has been produced in accordance with the method as described above.

A further subject of the present invention is therefore also the use of the above-described coating material system of the invention and/or of the polyurethane of the invention, produced in accordance with a method as described above, as coating material, in automotive finishing, for the repair of finishes, for automotive refinishing and/or for the coating of parts for installation in or on automobiles, of plastics substrates, or of commercial vehicles, and/or for painting any type of item.

It is preferred that the respective use is
  i) the painting is carried out at low temperature, preferably in a range of 20 to 50° C., more preferably in a range of 25 to 40° C., and/or
  ii) the item to be painted is of large size and/or of industrial production, preferably the item is selected from a truck, a crane, a train or a bridge, and/or
  iii) the coating material preferably being a clearcoat or a pigmented paint.

Since the coatings of the invention produced from the coating material systems of the invention exhibit outstanding adhesion even to already cured electrocoat systems, surfacer systems, basecoat systems, or customary and known clearcoat systems, they are outstandingly suitable not only for use in automotive production-line (OEM) finishing but also for automotive refinishing and/or for the coating of parts for installation in and on automobiles and/or for the coating of commercial vehicles.

Application of the coating material systems of the invention may be made by any customary application methods such as, for example, spraying, knifecoating, brushing, pouring, dipping, impregnating, trickling, or rolling. At application, the substrate to be coated may itself be at rest, with the application equipment or unit being moved. Alternatively, the substrate to be coated, more particularly a coil, may also be moved, with the application unit being at rest relative to the substrate or being moved appropriately.

Preference is given to employing spray application methods, such as, for example, compressed air spraying, airless spraying, high-speed rotation, electrostatic spray application (ESTA), optionally in conjunction with hot spray application, such as hot air spraying, for example.

The coating materials of the invention are outstandingly suitable as decorative, protective and/or effect coatings and coating systems for bodies of means of transport (especially powered vehicles, such as bicycles, motorcycles, coaches, trucks, or automobiles) or parts thereof; for the interior and exterior of edifices; for furniture, windows, and doors; for plastics moldings, more particularly CDs and windows; for small industrial parts, and for coils, containers, and packaging; for white goods; for films; for optical, electrical, and mechanical components; and also for hollow glassware and articles of everyday use.

The coating material systems of the invention can therefore be applied, for example, to an optionally precoated substrate, it being possible for the coating materials of the invention to be either pigmented or unpigmented. The coating material systems and paint systems of the invention, more particularly the clearcoat systems, are applied in particular in the technologically and esthetically particularly demanding field of automotive production-line (OEM) finishing and for the coating of plastics parts for installation in or on automobile bodies, more particularly for top-class automobile bodies, such as, for example, for producing roofs, tailgates, hoods, fenders, bumpers, spoilers, sills, protective strips, side trim, and the like, and also for automotive refinishing and for the finishing of commercial vehicles, such as, for example, of trucks, chain-driven construction vehicles, such as crane vehicles, wheel loaders, and concrete mixers, for example, buses, rail vehicles, watercraft, aircraft, and also agricultural equipment such as tractors and combines, and parts thereof.

The plastics parts consist customarily of ASA, polycarbonates, blends of ASA and polycarbonates, polypropylene, polymethyl methacrylates, or impact-modified polymethyl methacrylates, more particularly of blends of ASA and polycarbonates, preferably with a polycarbonate fraction >40%, more particularly >50%.

"ASA" refers in general to impact-modified styrene/ acrylonitrile polymers, in which graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference the coating materials of the invention are applied in multistage coating processes, more particularly in processes in which an optionally precoated substrate is coated first with a pigmented basecoat film and thereafter with a film with the coating material composition of the invention. Also subject matter of the invention, accordingly, are multicoat color and/or effect finishes comprising at least one pigmented basecoat film and at least one clearcoat film disposed thereon, these finishes being characterized in that the clearcoat film has been produced from the coating material composition of the invention.

Not only water-thinnable basecoats but also basecoats based on organic solvents can be used. Examples of suitable basecoats are described in EP-A 0 692 007 and in the documents recited at column 3, lines 50 ff., therein. The applied basecoat is preferably first dried—that is, at least some of the organic solvent and/or water is removed from the basecoat film in an evaporation phase. Drying takes place preferably at temperatures from room temperature to 80° C. After drying has taken place, the coating material composition of the invention is applied. The two-coat finish is subsequently baked, preferably under conditions applied in the context of automotive OEM finishing, at temperatures of 20 to 200° C., for a time of 1 min up to 10 h; in the case of the temperatures applied for automotive refinishing, which are in general between 20 and 80° C., more particularly between 20 and 60° C., longer curing times may also be applied.

In a further preferred embodiment of the invention, the coating material system of the invention is used as a transparent clearcoat for the coating of plastics substrates, more particularly of plastics parts for interior or exterior installation. These plastics parts for interior or exterior installation are preferably coated likewise in a multistage coating process, in which an optionally precoated substrate or a substrate pretreated for enhanced adhesion of the subsequent coatings (for example by flaming, corona treatment, or plasma treatment of the substrate) is coated first with a pigmented basecoat film and thereafter with a film with the coating material composition of the invention.

A further subject of the present invention is therefore also a method for producing a coating, in which at least one coating material system of the invention is applied to an optionally precoated substrate or to a basecoat film.

The coating (layer, film) preferably comprises a polyurethane obtained by at least partial or complete curing, preferably by complete curing, of the coating material system.

A further subject of the present invention is therefore also a coating (or layer) obtainable by the above-described process for producing the coating.

The invention is illustrated below with examples.

Catalysts

I) Preparation of Catalyst According to Component (C) of the Invention

Ia) Precursor of catalyst 1: 2,2-Diphenyldecanoic acid (dpdH)

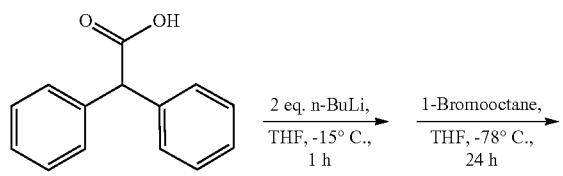

-continued

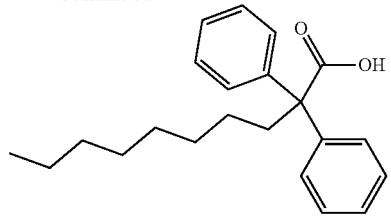

2,2-Diphenylacetic acid (10.6 g; 48 mmol) are dissolved in 75 mL of dry tetrahydrofuran (THF) under a protective gas atmosphere (argon or nitrogen) in a 200 mL Schlenk flask and cooled to −15° C. A 1.6M solution of n-butyllithium in hexane (60 mL; 96 mmol) is then added with stirring and over a period of 30 minutes. The reaction solution is stirred at −15° C. for one hour and cooled to −78° C. for the addition of 1-bromooctane (8.3 mL; 48 mmol). Subsequently, the reaction solution is slowly warmed to room temperature and stirred for a further 24 hours.

For the work-up and purification of the 2,2-diphenyldecanoic acid, a saturated ammonium chloride solution (60 mL) is added to the reaction solution and stirred for 30 minutes. The aqueous phase is separated by means of a separating funnel and extracted with 3×25 mL of diethyl ether. The combined organic phases were dried over magnesium sulfate ($MgSO_4$). All volatile solvents are then removed under reduced pressure ($1 \cdot 10^{-3}$ mbar) and the resulting solid dried at 140° C. under reduced pressure ($1 \cdot 10^{-3}$ mbar) for 24 hours.

Characterization by $^1$H-NMR, $^{13}$C-NMR, HRMS (high-resolution mass spectrometry), infra-red spectroscopy.

Ib) Catalyst 1: Bi(2,2-diphenyldecanoate)$_3$ (Bi(dpd)$_3$)

Triphenylbismuth (1.1 g; 2.5 mmol) and 2,2-diphenyldecanoic acid (2.43 g; 7.5 mmol) are initially charged under a protective gas atmosphere in a 25 mL three-necked flask equipped with stirrer bar, reflux condenser, thermometer and protective gas atmosphere inlet (argon or nitrogen). 12.5 mL of dry tetrahydrofuran or dry toluene (5 mL of solvent per 1 mmol of triphenylbismuth) are added to the reactants and the mixture is heated at 110° C. under a protective gas atmosphere for at least 16 hours. The reaction course is monitored by $^1$H-NMR (nuclear magnetic resonance spectroscopy). After complete conversion of triphenylbismuth with formation of benzene, the reaction is terminated and cooled. All volatile solvents are then removed under reduced pressure ($1 \cdot 10^{-3}$ mbar) and the resulting solid dried at 60° C. under reduced pressure ($1 \cdot 10^{-3}$ mbar) for 24 hours. As required, the resulting compound is purified from toluene and hexane at −40° C. or by recrystallization from hot toluene.

Characterization by $^1$H-NMR, $^{13}$C-NMR, C/H/N elemental analysis, infra-red spectroscopy.

11.8 g of Bi(DPD)$_3$ were then dissolved in 88.2% technical Xylene. This results in a Bi-concentration of 1.9%.

II) Catalyst 2: (Comparative)

10 g of K-Kat XK651 (King Industries, 23% Bi-salt in Neodecanoic acid) was dissolved in 90% technical Xylene. This results in a Bi-concentration of 2.1%.

III) Coating Material System:

Binder (Component A)

Macrynal SM510/60LG as available from Allnex, OH-value 140-160 mg KOH/g (on solids). Macrynal SM510 is a Cardura-E® modified acrylic resin based mainly on styrene and hydroxiethylmethacrylate.

Hardener (Component B)

76 g of TOLONATE HDT 90 (Vencorex Chemicals) is dissolved with 12 g Xylene and 12 g Solventnaphtha (boiling point 160-180° C.). Tolonate™ HDT 90 is an aliphatic polyisocyanate, based on HDI-trimer (isocyanurate), supplied at 90% solids in a blend of butyl-acetate/high flash aromatic solvent (1 for 1 by weight).

TABLE 1

Clearcoat compositions/specific coating material systems

| pos | Components | E1 | E2 | V1 | E3 | E4 |
|---|---|---|---|---|---|---|
| 1 | component A | 63.878 | 63.878 | 63.878 | 63.878 | 63.878 |
| 2 | SOLVENTNAPHTHA 160/180 | 9.769 | 9.769 | 9.769 | 9.769 | 9.769 |
| 3 | BUTYLDIGLYKOLACETAT | 1.028 | 1.028 | 1.028 | 1.028 | 1.028 |
| 4 | BYK-325 N 52% | 0.159 | 0.159 | 0.159 | 0.159 | 0.159 |
| 5 | Hydroxiphenylalkylbenzotriazole (UV-Absorber) | 1.15 | 1.15 | 1.15 | 1.15 | 1.15 |
| 6 | EVERSORB 93 (HALS) | 0.793 | 0.793 | 0.793 | 0.793 | 0.793 |
| 7 | XYLENE | 7.18 | 7.18 | 7.18 | 7.18 | 7.18 |
| 8 | BUTYLGLYKOLACETAT | 7.404 | 7.404 | 7.404 | 7.404 | 7.404 |
| 9 | BUTYLACETATE | 8.638 | 8.638 | 8.638 | 8.638 | 8.638 |
| 10 | Catalyst 1 | 0.6 | 1.2 | | 1.2 | 1.2 |
| 11 | Catalyst 2 | | | 1.089 | | |
| 12 | 3-Mercaptopropionic acid | | | | 0.446 | |
| 13 | 2-ethylhexyl-3-mercaptopropionate | | | | | 0.92 |
| 14 | Hardener (component (B)) | 30 | 30 | 30 | 30 | 30 |

The specific clearcoat compositions E1 to E4 are based on coating material systems according to the present invention, whereas the clearcoat composition V1 is a comparative example. The clearcoat compositions E1 to E4 and V1 are employed within tables 2 to 5 as shown below.

IV) Application

A mixing clear was formulated from above components including pos 1-10. It was then separated into 5 parts revealing each 100 parts of amount. Prior to application, comp 11-13 were subsequently added and after each addition homogenized with the mixing clear through stirring. To each of the so generated mixtures 30 parts of hardener (H) are added and also homogenized through stirring.

By usage of a 100 µm doctor blade, the clearcoats are applied on a glass panel, 10×20 cm, stored at ambient temperature for 10 minutes and then cured in a ventilated oven for the given times and temperatures. After having cooled down, the resulting films were tested according to conditions as shown in subsequent table.

In respect of the results as shown below within tables 2 to 5, it is indicated that storage condition for ageing is ambient temperature between 23 and 25° C. Tests for pendulum hardness as shown in tables 2 to 4 were made according DIN EN ISO 1522. The resulting films were about 45-55µ thick. The higher the respective value within tables 2 to 4, the harder the respective film and the better the result. The longer the time within table 5, the better the result. The measurements according to table 5 are performed by employing a plate cone viscosimeter CAP2000 (Brookfield Engineering).

Results

TABLE 2

Curing condition: ambient temperature for 7 days

| | E1 | E2 | V1 | E3 | E4 |
|---|---|---|---|---|---|
| hits | 127 | 110 | 70 | 129 | 117 |

TABLE 3

Curing condition: 30 minutes at 40° C.

| | E1 | E2 | V1 | E3 | E4 |
|---|---|---|---|---|---|
| hits after 6 h storage at ambient | 15 | 25 | 18 | 29 | 34 |
| hits after 24 h storage at ambient | 36 | 57 | 36 | 85 | 84 |
| hits after 48 h storage at ambient | 50 | 85 | 49 | 118 | 114 |
| hits after 7 d storage at ambient | 80 | 93 | 72 | 135 | 141 |

TABLE 4

Curing condition: 30 minutes at 60° C.

| | E1 | E2 | V1 | E3 | E4 |
|---|---|---|---|---|---|
| hits after 6 h storage at ambient | 35 | 39 | 45 | 85 | 47 |
| hits after 24 h storage at ambient | 48 | 49 | 56 | 99 | 60 |
| hits after 48 h storage at ambient | 64 | 60 | 66 | 105 | 68 |
| hits after 7 d storage at ambient | 73 | 78 | 84 | 133 | 81 |

Potlife

Directly after mixing the clearcoat with hardener the viscosity increase of the mixtures was measured every 10 minutes. The results are recorded in an X/Y diagram. By interpolation of the so resulting graphs the potlife can be evaluated which is defined as the time to reach double the viscosity of the fresh sample

TABLE 5

| | E1 | E2 | V1 | E3 | E4 |
|---|---|---|---|---|---|
| doubling visc in minutes | 20 | 11 | 12.4 | 123 | 146.8 |

By these results according to tables 2 to 5, it can be seen, that the inventive coating material systems are especially suitable for low temperatures. At ambient temperature the hardness of the resulting films is significantly higher than with the comparative. At higher temperatures the usage of the comparative coating material systems reveals in films of slightly higher hardness but this can be compensated by usage of mercaptanes for the inventive coating material systems. By usage of selected mercaptanes the potlife is dramatically increased without any drawback for final hardness and hardness development. Surprisingly, the usage of mercaptanes ends up with higher hardness of the resulting films. By consequence, the presence of mercaptanes results in an even better performance of the respective working examples of the present invention.

The invention claimed is:

1. A coating material system comprising components (A) to (C):
(A) at least one polyhydroxy group-containing compound,
(B) at least one polyisocyanate-containing compound, and
(C) at least one bismuth-containing catalyst according to general formula (I)

$$((R^1)^-)_x((R^2)^-)_y((X)^-)_z(Bi)^{3+} \quad (I)$$

in which the variables are defined as follows:
$R^1$ is mutually independently a radical of the general formula (II)

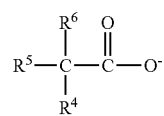

and x is 1, 2 or 3;
$R^2$ is mutually independently a radical of the general formula (III)

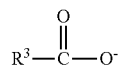

and y is 0, 1 or 2;
X is mutually independently hydroxyl, halogen, carbonate, hydrogencarbonate or $R^7$ and z is 0, 1 or 2;
wherein the sum total of x, y and z is equal to 3;
$R^3$ is unsubstituted or at least monosubstituted $C_1$-$C_{30}$-alkyl, $C_6$-$C_{14}$-aryl or $C_7$-$C_{30}$-aralkyl,
wherein the substituents are selected from the group consisting of hydroxyl, halogen, carboxyl, —$CF_3$, —$NH_2$, $C_1$-$C_6$-alkoxy, $C_1$-$C_{30}$-alkyl and $C_6$-$C_{14}$-aryl and the alkyl and aryl fragments of these substituents may in turn be at least monosubstituted by hydroxyl, halogen, —$CF_3$, —$NH_2$ or $C_1$-$C_6$-alkoxy,
and wherein the carbon atom of the radical $R^3$ bonded directly to the carbon atom of the carboxyl group of the general formula (III) does not comprise any unsubstituted or at least monosubstituted $C_6$-$C_{14}$-aryl as substituent,
$R^4$, $R^5$ and $R^6$ are mutually independently unsubstituted or at least monosubstituted $C_1$-$C_{30}$-alkyl, $C_6$-$C_{14}$-aryl or $C_7$-$C_{30}$-aralkyl,
wherein the substituents are selected from the group consisting of hydroxyl, halogen, carboxyl, —$CF_3$, —$NH_2$, $C_1$-$C_6$-alkoxy, $C_1$-$C_{30}$-alkyl and $C_6$-$C_{14}$-aryl and the alkyl and aryl fragments of these substituents may in turn be at least monosubstituted by hydroxyl, halogen, —$CF_3$, —$NH_2$ or $C_1$-$C_6$-alkoxy,
and wherein at least one of the radicals $R^4$, $R^5$ or $R^6$ is unsubstituted or at least monosubstituted $C_6$-$C_{14}$-aryl,
$R^7$ is unsubstituted or at least monosubstituted $C_1$-$C_{30}$-alkyl, $C_6$-$C_{14}$-aryl or $C_7$-$C_{30}$-aralkyl,
wherein the substituents are selected from the group consisting of hydroxyl, halogen, carboxyl, —$CF_3$, —$NH_2$, $C_1$-$C_6$-alkoxy, $C_1$-$C_{30}$-alkyl and $C_6$-$C_{14}$-aryl and the alkyl and aryl fragments of these substituents may in turn be at least monosubstituted by hydroxyl, halogen, —$CF_3$, —$NH_2$ or $C_1$-$C_6$-alkoxy,
and wherein
i) components (A), (B), and (C) are present separately from one another or
ii) are mixed wholly or at least partly with one another.

2. The coating material system as claimed in claim 1, wherein within the bismuth-containing catalyst of component (C)
i) $R^4$, $R^5$ and $R^6$ are mutually independently unsubstituted or at least monosubstituted $C_1$-$C_{12}$-alkyl or $C_6$-$C_{14}$-aryl, wherein the substituents are selected from the group consisting of hydroxyl, chlorine, —$CF_3$ and $C_1$-$C_6$-alkyl,
and wherein at least one of the radicals $R^4$, $R^5$ or $R^6$ is unsubstituted or at least monosubstituted $C_6$-$C_{14}$-aryl, and/or
ii) $R^3$ is unsubstituted or at least monosubstituted $C_1$-$C_{12}$-alkyl, wherein the substituents are selected from the group consisting of hydroxyl, chlorine and —$CF_3$, and/or
iii) X is hydroxyl, chlorine or $R^7$ and $R^7$ is unsubstituted or at least monosubstituted $C_1$-$C_{12}$-alkyl or $C_6$-$C_{14}$-aryl, wherein the substituents are selected from the group consisting of hydroxyl, chlorine, —$CF_3$ and $C_1$-$C_6$-alkyl.

3. The coating material system as claimed in claim 1, wherein within the bismuth-containing catalyst of component (C)
i) $R^4$ is unsubstituted or at least monosubstituted phenyl, wherein the substituents are selected from the group consisting of hydroxyl, chlorine, —$CF_3$ and $C_1$-$C_6$-alkyl,
ii) $R^5$ is unsubstituted or at least monosubstituted phenyl or $C_1$-$C_{12}$-alkyl, wherein the substituents are selected from the group consisting of hydroxyl, chlorine, —$CF_3$ and $C_1$-$C_6$-alkyl, and
iii) $R^6$ is unsubstituted or at least monosubstituted phenyl or $C_1$-$C_{12}$-alkyl, wherein the substituents are selected from the group consisting of hydroxyl, chlorine, —$CF_3$ and $C_1$-$C_6$-alkyl.

4. The coating material system as claimed in claim 1, wherein the bismuth-containing catalyst of component (C) is at least one bismuth-containing catalyst according to general formula (Ia)

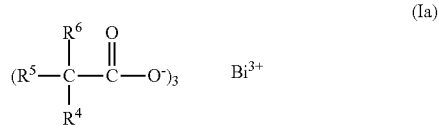

wherein the radicals $R^4$ to $R^6$ are mutually independently defined as in claim 1.

5. The coating material system as claimed in claim 1, wherein the acid number of the polyhydroxy group-containing compound of component (A) is not more than 9 mg KOH/g of the corresponding polyhydroxy group-containing compound.

6. The coating material system as claimed in claim 1, which comprises at least one further component (D) to (K), selected from the group consisting of hydroxyl group-containing compounds (D), aminoplast resins and/or tris (alkoxycarbonylamino) triazines (E), coating additives (F), pigments (H), other fillers (I), solvents (J), and mercapto group-containing compounds (K),
wherein
i) the individual components (D) to (K) are present separately from one another or
ii) are mixed wholly or at least partly with one another and/or with components (A) to (C).

7. The coating material system as claimed in claim 1, wherein
i) the coating material system is not aqueous, and/or
ii) components (A) and/or (B) each form a mixture with at least one solvent (J), but components (A) and (B) are present separately from one another, and/or
iii) the catalyst of component (C) is present entirely or at least partly in at least one of the components (A) or (B) present separately from one another.

8. The coating material system as claimed in claim 6, wherein the coating material system is present as a complete mixture of components (A), (B), and (C) and also of optionally present components (D) to (K).

9. A method for producing a coating material system as claimed in claim 8, wherein components (A), (B), and (C) and also optionally present components (D) to (K) are provided separately from one another and subsequently mixed with one another.

10. A method for producing a polyurethane by at least partial or complete curing of the coating material system as produced by the method according to claim 9.

11. The method as claimed in claim 10, wherein the polyurethane forms a layer or coating or is at least part of a layer or coating.

12. The method as claimed in claim 10, wherein the polyurethane comprises at least one pigment (H) and/or wherein the polyurethane is applied in layer form to a basecoat film which optionally comprises at least one pigment (H), or to an optionally precoated substrate.

13. The method as claimed in claim 10, wherein the curing of the polyurethane takes place at temperatures of 20 to 200° C., the optional basecoat film having optionally been dried beforehand at temperatures of 20° C. to 80° C.

14. A method of using the coating system as claimed in claim 1 as coating material, in automotive finishing, for the repair of finishes, for automotive refinishing and/or for the coating of parts for installation in or on automobiles, of plastics substrates, or of commercial vehicles, and/or for painting any type of item.

15. The method as claimed in claim 14, wherein
i) the item to be painted is of industrial production, and/or
ii) the coating material is a clearcoat or a pigmented paint.

16. A method for producing a coating, wherein at least one coating material system as claimed in claim 1 is applied to an optionally precoated substrate or to a basecoat film.

17. The method as claimed in claim 16, wherein the coating comprises a polyurethane which is obtained by at least partial or complete curing of the coating material system.

18. The coating material system as claimed in claim 1, wherein
i) the polyhydroxy group-containing compound of component (A) is selected from the group consisting of the polyacrylate polyols and the polymethacrylate polyols, and/or
ii) the polyisocyanate-containing compound of component (B) is selected from the group consisting of 1,6-hexamethylene diisocyanate, isophorone diisocyanate, 4,4'-methylene dicyclohexyl diisocyanate, the biuret dimers of the aforesaid diisocyanates, the iminooxadiazinediones of the aforesaid diisocyanates and the trimers of the aforesaid diisocyanates in the coating material system.

19. The coating material system as claimed in claim 1, wherein the acid number of the polyhydroxy group-containing compound of component (A) is not more than 7 mg KOH/g of the corresponding polyhydroxy group-containing compound.

* * * * *